United States Patent
Kim et al.

(12)

(10) Patent No.: US 6,487,656 B1
(45) Date of Patent: Nov. 26, 2002

(54) SYSTEM AND METHOD FOR PROVIDING FUNCTIONALITIES TO SYSTEM BIOS

(75) Inventors: Myungseok Kim, Irvine; Glenn E. Jystad, Dove Canyon, both of CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/459,060

(22) Filed: Dec. 10, 1999

(51) Int. Cl.$^7$ ............................................... G06F 9/445
(52) U.S. Cl. ............................................................ 713/2
(58) Field of Search ........................................ 713/1, 2

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,581,740 A | 12/1996 | Jones |

(List continued on next page.)

*Primary Examiner*—Thomas M. Heckler

(57) ABSTRACT

The present invention is a method and apparatus to provide functionalities to a system BIOS. The method comprises interfacing an interface module to the system BIOS, and receiving a request from the system BIOS to perform a task. System device information associated with the task is received from the system BIOS. The interface module translates the system device information to provide translated information. The translated information is then transferred to a corresponding module.

27 Claims, 11 Drawing Sheets

U.S. PATENT DOCUMENTS

| | | |
|---|---|---|
| 5,586,327 A | 12/1996 | Bealkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,706 A | 9/1998 | Stewart et al. |
| 5,819,063 A | 10/1998 | Dahl et al. |
| 5,828,888 A | 10/1998 | Kozaki et al. |
| 5,832,251 A | 11/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |
| 6,367,007 B1 * | 4/2002 | Do ................................ 713/2 |
| 6,374,338 B1 * | 4/2002 | Garrey ...................... 711/170 |
| 6,401,202 B1 * | 6/2002 | Abgrall ......................... 713/2 |

* cited by examiner

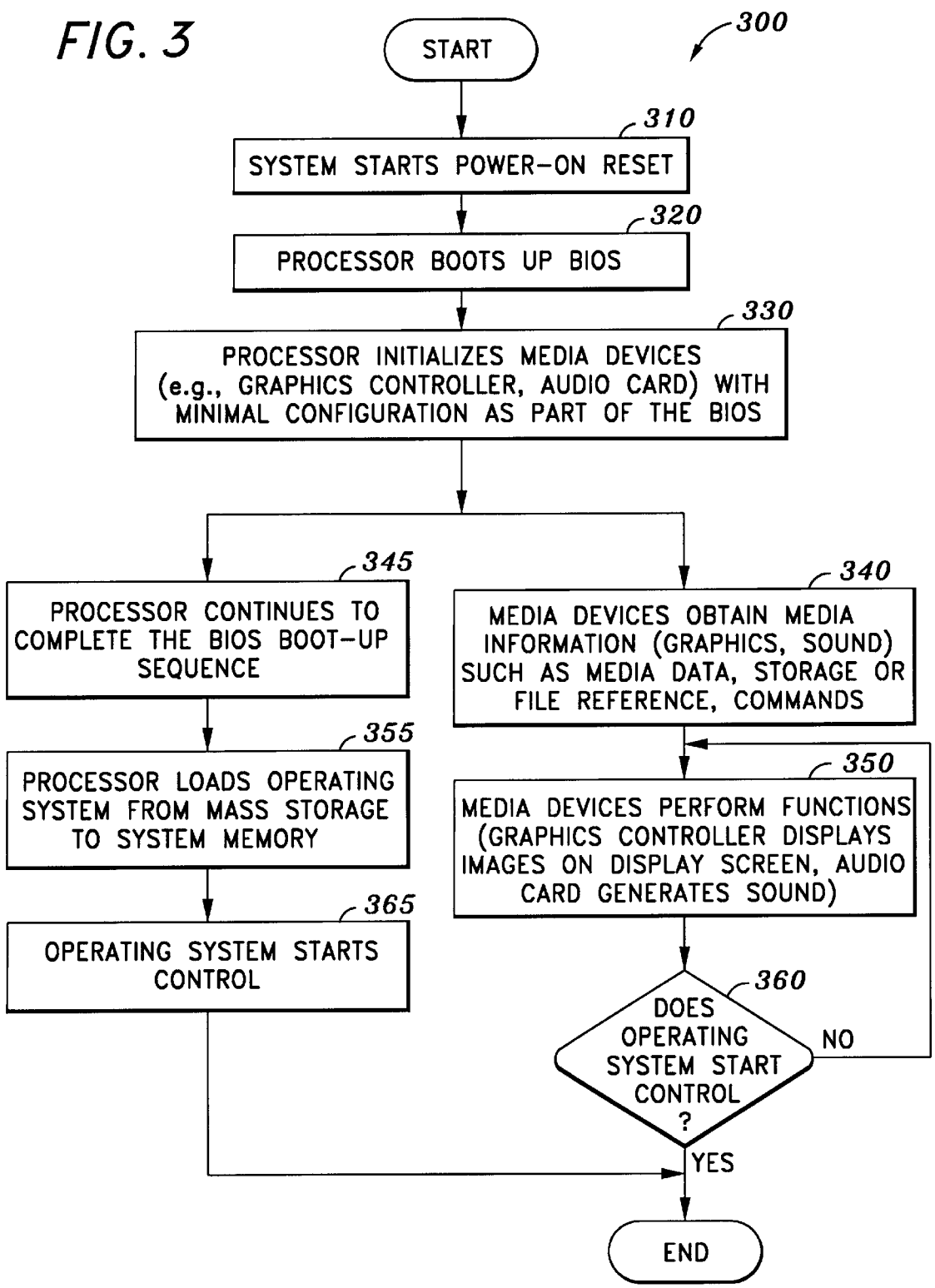

FIG. 5B

| KEYWORD | OBJECT NAME |
|---|---|
| PROCESSOR TYPE A | NAME.EXT 1 |
| PROCESSOR TYPE B | NAME.EXT 2 |
| ⋮ | ⋮ |
| PROCESSOR TYPE M | NAME.EXT 3 |
|  |  |

SYSTEM AND METHOD FOR PROVIDING FUNCTIONALITIES TO SYSTEM BIOS

BACKGROUND

1. Field of the Invention

This invention relates to multimedia. In particular, the invention relates to a system and method for providing functionalities to a Basic Input/Output System (BIOS).

2. Description of Related Art

Currently, if additional functionalities are being added to the system BIOS, significant changes have to be implemented. In particular, the system BIOS code has to be significantly revised.

Accordingly, there is a need to provide additional functionalities to system BIOS without having to significantly alter the system BIOS code. There is also a further need in the industry to provide and display system device information simply and efficiently.

In addition, information regarding system devices such as processor performance information and memory size information, is traditionally displayed in textual format. Such system device information is typically determined at the time of manufacture. During the boot process, the system device information determined at the time of manufacture is detected and/or retrieved by the system BIOS and displayed in textual format. Such information is difficult to view as the user has to sort through lines of text to locate the desired information.

There is thus a further need in the industry to provide and display system device information simply and efficiently.

SUMMARY

The present invention is a method and apparatus to provide functionalities to a system BIOS. The method comprises interfacing an interface module to the system BIOS, and receiving a request from the system BIOS to perform a task. System device information associated with the task is received from the system BIOS. The interface module translates the system device information to provide translated information. The translated information is then transferred to a corresponding module.

BRIEF DESCRIPTION OF THE DRAWINGS

The features and advantages of the present invention will become apparent from the following detailed description of the present invention in which:

FIG. 3 is a flowchart illustrating one embodiment of a process to display information in accordance with the principles of the invention.

FIG. 5B is a chart illustrating one embodiment of a processor mapping table.

DESCRIPTION

The present invention is a method and apparatus to provide functionalities to system BIOS in a simple, elegant and flexible manner. An interface module is provided, which enables various parties such as PC system manufacturers and motherboard manufacturers to provide additional system BIOS functionalities with minimal impact to the system BIOS code. The method comprises interfacing an interface module to the system BIOS, and receiving a request from the system BIOS to perform a task. System device information associated with the task is received from the system BIOS. The interface module translates the system device information to provide translated information. The translated information is then transferred to a corresponding module.

In addition, the present invention is a method and apparatus to provide and display system device information simply and efficiently.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

Figure 1:
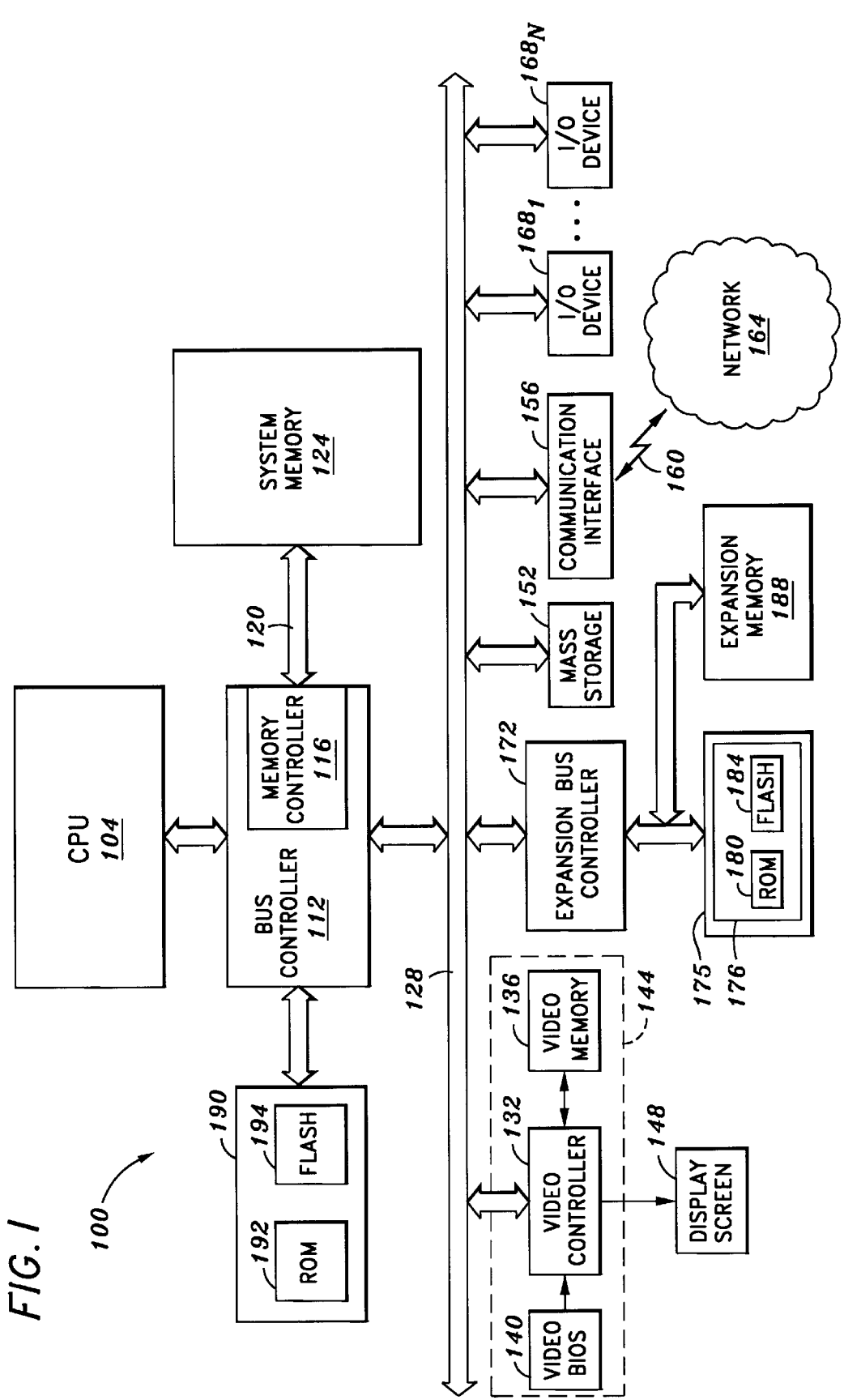
FIG. 1 illustrates an exemplary processor system or user computer system, which implements embodiments of the present invention.

FIG. 1 illustrates an exemplary computer system 100 that implements embodiments of the present invention. Referring to FIG. 1, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium, Pentium II, and Pentium Pro microprocessors as marketed by Intel Corporation, the K-6 microprocessor as marketed by AMD, or the 6x86MX microprocessor as marketed by Cyrix Corp. Further examples include the Alpha processor as marketed by Digital Equipment Corporation, the 680X0 processor as marketed by Motorola; or the Power PC processor as marketed by IBM. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like.

The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to non-volatile memory 175, which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs, which control the computer system's operation, and the allocation of resources. The application program is a set of one or more software programs that perform a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The booting up of the BIOS and the loading of the operating system by the BIOS may take several seconds. During that time, the monitor screen merely displays BIOS information such as test statistics and results. In most situations, these results are the same and provide no useful information to the user. Therefore, it is preferable to display other graphics such as advertisements, banners downloaded from the internet, or to generate sound during this time. These activities can be performed in the pre-boot period at the early stage of the BIOS booting-up sequence. A media device is a device that can generate graphics or sound, or other media information. For example, a graphics engine or a graphics controller typically has a set of primitives that allows it to display large complex images based on a small amount of data. The resultant display remains on the screen until the BIOS boot-up is completed or when the machine has started to do something else.

Figure 2:
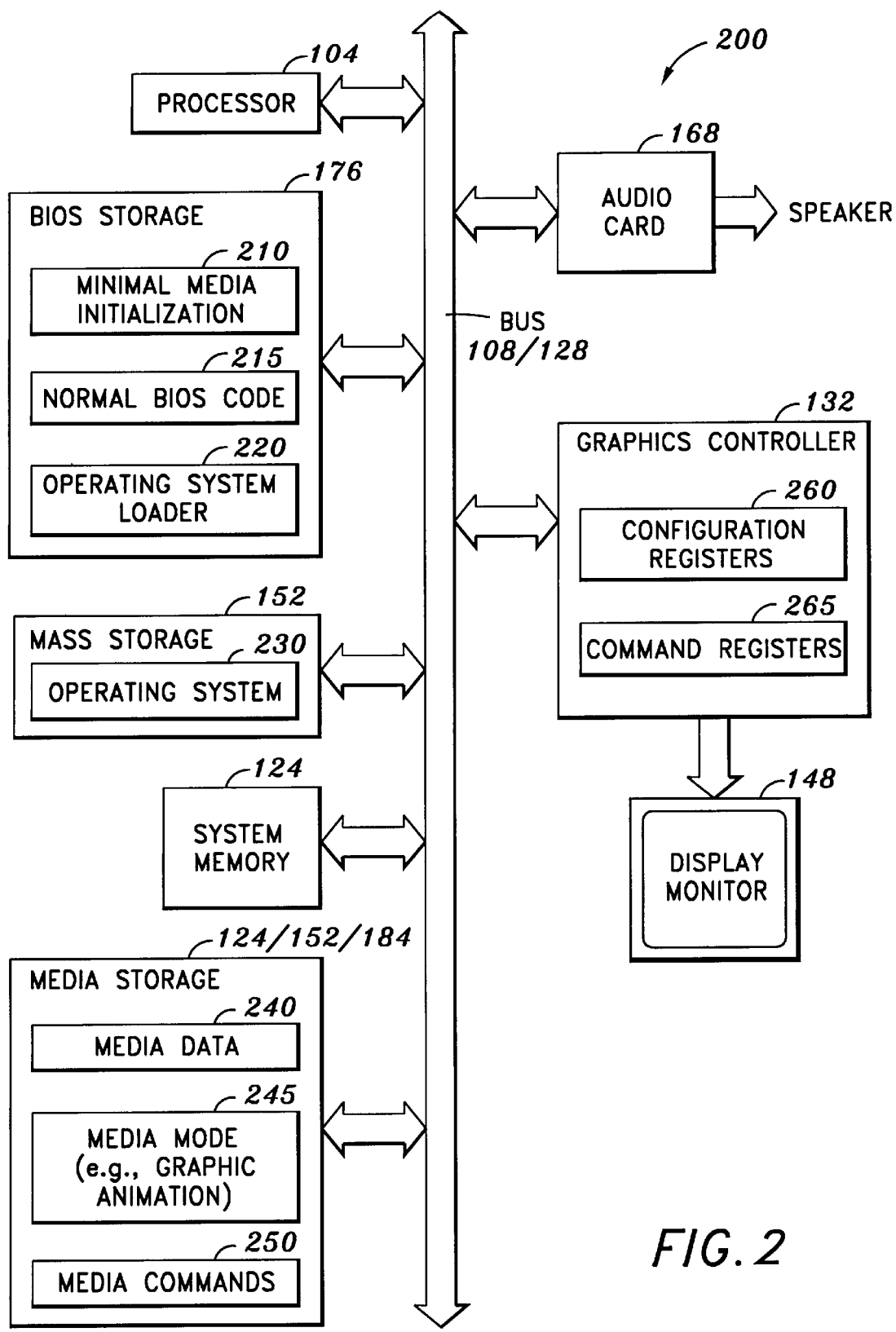
FIG. 2 illustrates one embodiment of the information display screen in accordance with the principles of the invention.

FIG. 2 is a diagram illustrating a pre-boot media system 200 according to one embodiment of the invention. The pre-boot media system 200 essentially is a subset of the system 100 as shown in FIG. 1. The pre-boot media system 200 includes the processor 104, the bus 108/128, the BIOS storage 176, the mass storage 152, a system memory 124, the media storage 124/152/184, an audio card 168, the graphics or video controller 132, and the display monitor 148.

The processor 104 executes instructions in the BIOS storage 176 and the operating system when loaded into the system memory 124. In the pre-boot activities, the processor communicates with the audio card 168 and the graphics controller 132 via the bus 108/128. Upon power on reset, the processor 104 begins to fetch instructions starting from a predefined address to begin booting the BIOS from the BIOS storage 176.

The BIOS storage 176 contains the BIOS which includes a minimal media initialization code 210, a normal BIOS code 815, and an operating system (OS) loader 220. Typically, the processor 104 executes the minimal media initialization code 210 first, then the normal BIOS code 215, and finally the OS loader 220.

The minimal media initialization code 210 includes minimal code that initializes the graphics controller 132 and/or the audio card 168 so that a pre-boot media generation can be performed. The initialization code 210 may include instructions that configure the display mode (e.g., the color depth and the display resolution) of the graphics controller 132, the audio mode of the audio card 168, graphic and/or audio commands, addresses of graphics data and/or sound data. For more advanced graphics controllers, the initialization code 210 may include a complete code sequence that allows the graphics controller to generate images without or with very little additional graphic information. For these graphics controllers, the initialization code 210 may include commands to generate graphic primitives such as pixels, lines, simple shapes, shading, colors, and the specific location on the display screen to display the resulting image. The minimal media initialization code 210 is typically performed at the early stage of the BIOS boot-up so that the pre-boot media generation can start as soon as possible. After the processor 104 executes the minimal media initialization code 210, the graphics controller 132 and/or the audio card 168 begin to function independently of the processor 104.

The normal BIOS code 215 includes instructions to perform normal BIOS tasks during a normal BIOS boot-up. These tasks include POST, initialization and configuration of peripheral devices (including the graphics controller 132 and the audio card 168 if necessary), and other system tests. During this time, the graphics controller 132 continues to generate images to be displayed on the display monitor 132. The audio card 168 also continues to generate sound.

The OS loader 220 includes instructions to load the OS 230 from the mass storage 152 to the system memory 124.

As soon as the OS is loaded into the system memory 124, control is passed to the OS and the processor 104 executes the appropriate program from the OS. During the loading time of the OS, the graphics controller 132 and the audio card 168 continue to generate graphics and sound. Since the loading time of the OS may take several seconds to complete, this time is used productively to display useful information on the monitor and/or to generate useful sound. When the OS takes over, the graphics and the sound activities may be performed as required in the appropriate driver of the OS. The pre-boot media activities may be terminated and the normal system operations may begin.

The mass storage 152 stores the OS 230 and other data and information. The OS 230 is loaded into the system memory 124 at the end of the BIOS boot-up as described above. Normally, only a portion of the OS 230 is resident in the system memory 230. Drivers or programs, data may be swapped in and out between the system memory 124 and the mass storage 152 as necessary. The OS 230 may include drivers that re-start the graphics controller 132 and the audio card 168 as appropriate. Normally, when the OS 230 begins execution, the pre-boot media activities are terminated.

The system memory 124 includes random access memory (RAM) that contains the loaded portions of the OS 230. The system memory 124 may also include other types of memory such as flash memory.

The media storage 124/152/184 stores the media information to be used by the media devices if necessary. The media storage 124/152/184 may be part of the system memory 124, the mass storage 152, or the flash memory 184. The media information includes media data 240, media mode 245, and media commands 250. The media data 240 are the data to be used by the media device directly for generating the media output. The data may be accessed directly on the media storage 124/152/184, or is referenced by a pointer or file name. Examples of the media data include graphic bitmapped data and sequence of digitized audio samples. The media mode 245 provides the mode of operation of the media device. For example, a graphic animation mode refer to a series of repetitive sequence of graphics frames. The media commands 250 are the specific commands to be used by the media device to carry out its function. Example of the media commands 250 include a command to put an image of the graphic data to a specified location on the screen, or a command to render the image in a certain way.

The audio card 168 generates sound to a speaker using the sound data in the media data 240. The graphics controller 132 generates images to be displayed on the display monitor 148. The graphics controller 132 includes configuration registers 260 and command registers 265. The configuration registers 260 are used to configure the graphics controller 132 to operate under specified mode. The command registers 265 contain commands to specify the specific operation such as block filling, line drawing, etc. The processor 104 initializes the audio card 168 and the graphics controller 132 by writing configuration data and commands to the corresponding media devices. As soon as the media device is initialized, it can begin to operate on its own. The audio card 168 can retrieve the audio data from the media storage 124/152/184 to produce sound to the speaker. The graphics controller 132 can retrieve the graphic data from the media storage 124/152/184 and generate images on the display screen. Additional commands can be obtained from the media commands 250 to produce further media results.

FIG. 3 is a flowchart illustrating a process 300 for media pre-booting according to one embodiment of the invention.

Upon START, the system starts the power on reset sequence (Block 310). The processor then boots up the BIOS by accessing the BIOS storage (Block 320). The processor initializes the media devices (e.g., the graphics controller, the audio card) with minimal configuration as part of the BIOS (Block 330). The minimal configuration provides enough information for the graphics controller and/or the audio card to begin their own operation independently of the processor.

Then the process 300 is split into two parallel paths: the BIOS path corresponds to the BIOS execution and the media path corresponds to the media devices. The media path includes blocks 340, 350 and 360. The BIOS path includes blocks 345, 355, and 365.

In the BIOS path, the processor continues to complete the BIOS boot-up sequence (Block 345). The remaining BIOS tasks may take several seconds to complete. During that time the graphics controller and/or the audio card perform their function as initialized and configured. After the BIOS tasks are completed, the processor loads the operating system from the mass storage to the system memory (Block 355). Typically, only a portion of the OS system is loaded at a time. After the OS is loaded into the system memory, control is passed onto the OS from the BIOS, and the OS begins to take control and may produce graphics and sound other than what was being generated (Block 365). Then the process 300 is terminated.

After being initialized and configured, the media devices obtain media information such as graphics data, sound data, file reference, commands, primitives, etc. (Block 340). Then the media devices proceed to perform their functions (Block 350). The graphics controller retrieves graphic data and use graphic primitives to display images on the display monitor. The graphic data may correspond to the advertisement or banners as stored in the appropriate storage. Animation can also be performed using a sequence of frames. The audio card generates sound by playing the sound data as retrieved from the audio storage.

Then the process 300 determines if the operating system has taken over control of the system (Block 360). If not, the process 300 goes back to block 350 to continue the media operations. Otherwise, the process 300 is terminated.

One aspect of the present invention is a method and apparatus to provide functionalities to system BIOS in a simple, elegant and flexible manner. An interface module is provided, which enables various parties such as PC system manufacturers and motherboard manufacturers to provide additional system BIOS functionalities with minimal impact to the system BIOS code. The method comprises interfacing an interface module to the system BIOS, and receiving a request from the system BIOS to perform a task. System device information associated with the task is received from the system BIOS. The interface module translates the system device information to provide translated information. The translated information is then transferred to a corresponding module.

Another aspect of the invention involves a system and method for measuring system device performance on-the-fly and the graphical display the results. In one embodiment, the measured information is associated with a corresponding graphic object and displayed for viewing.

It should be noted that the implementation of the interface module may be provided independently of the technique for generating media output, and the technique for measuring system device performance on-the-fly and the graphical display of the results.

Figure 4A:
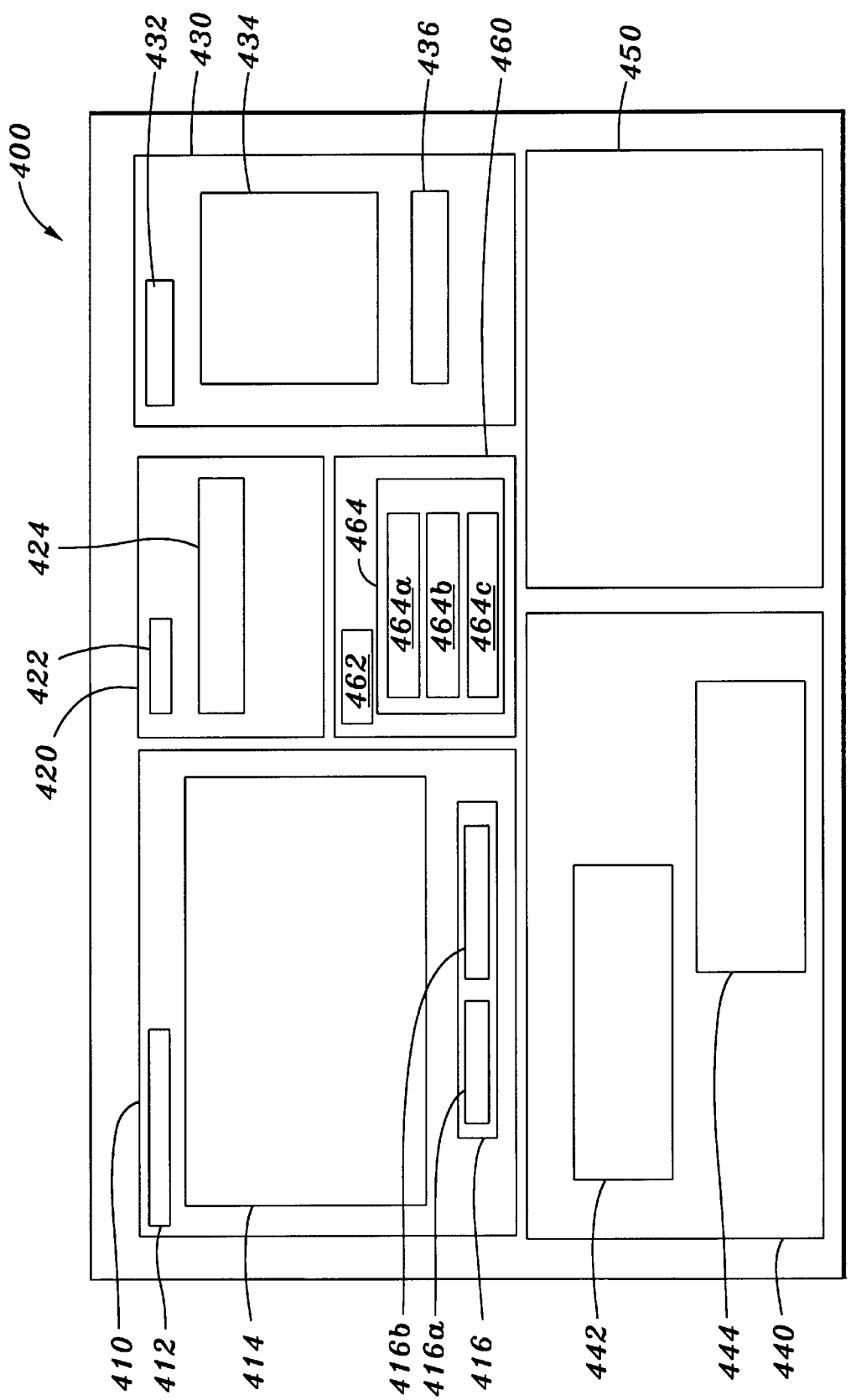
FIG. 4A illustrates one embodiment of the information display screen in accordance with another aspect of the invention.

FIG. 4A illustrates one embodiment of the information display screen 400 in accordance with the principles of the invention. The display screen 400 shows an exemplary display of six zones: zone 1 410, zone 2 420, zone 3 430, zone 4 440, zone 5 450 and zone 6 460. Each zone 410, 420, 430, 440, 450 and 460 may further include sub zones. For example, zone 1 410 includes sub zones 412, 414 and 416, zone 2 420 includes sub zones 422 and 424, zone 3 includes sub zones 432, 434 and 436, zone 4 includes sub zones 442 and 444, and zone 6 460 includes sub zones 462 and 464. Each sub zone may further include one or more fields. For example, sub zone 416 includes fields 416a and 416b, while sub zone 464 includes fields 464a, 464b and 464c.

A template that is used to generate these zones includes a series of commands using a box command that specifies the coordinates of the four corners of each zone. In addition, the corresponding bitmap and text files are referenced to be used for each zone. For example each zone 410, 420, 430, 440, 450 and 460 may be rendered using a bitmap or text files contained in a corresponding referenced text file, logo file or bitmap file. One embodiment of such a technique is described in detail in co-pending U.S. patent application Ser. No. 09/336,509 filed Jun. 18, 1999 entitled "Generating Media Output During BIOS Boot-Up" and co-pending U.S. Patent Continuation-in-Part Application entitled "Generating Media Output During BIOS Boot-Up" filed Dec. 10, 1999, both of which are incorporated herein by reference.

Figure 4B:
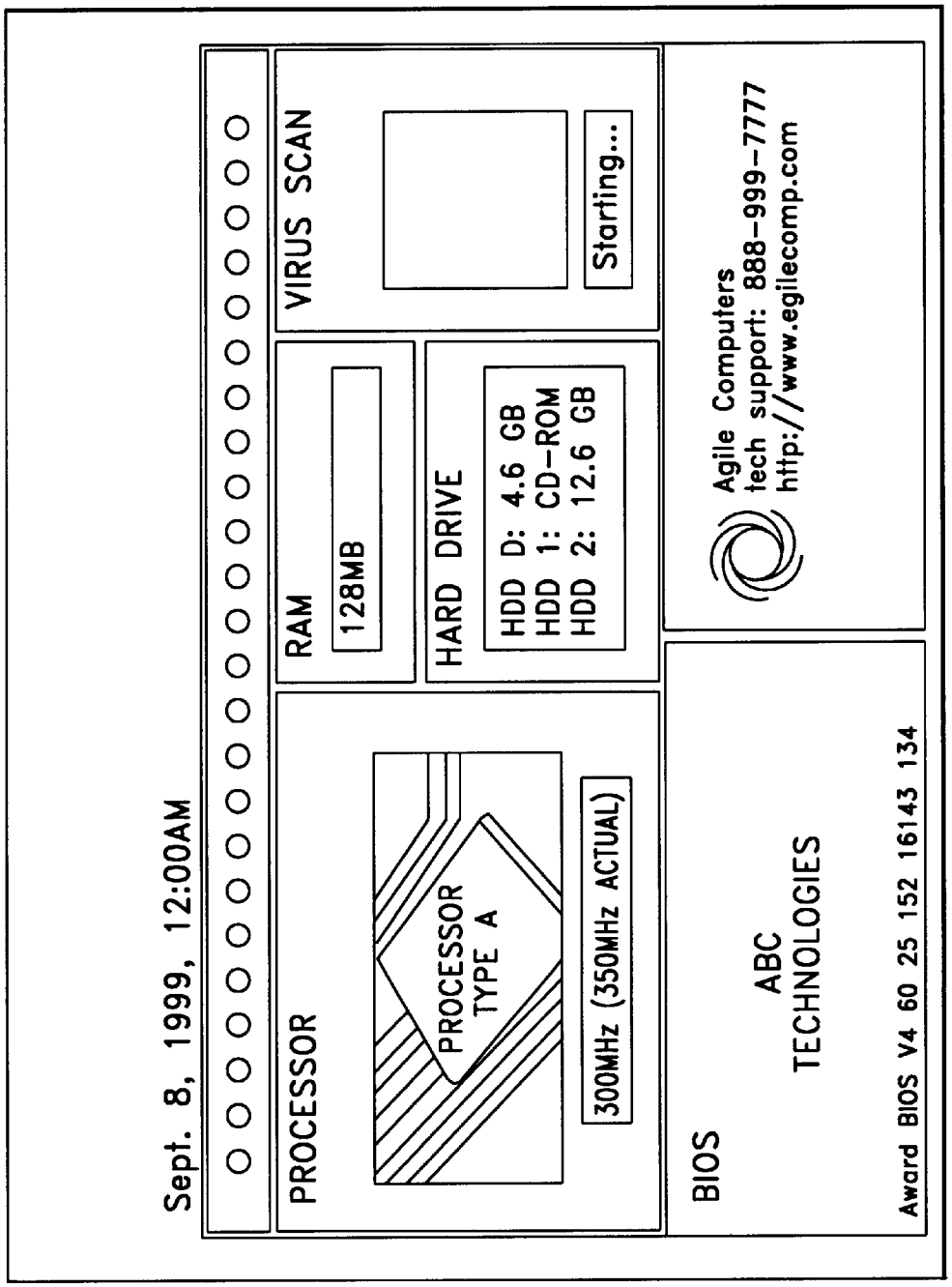
FIG. 4B illustrates a second embodiment of the information display screen in accordance with another aspect of the invention.

In one embodiment, as shown in FIG. 4B, the zones 410, 420, and 460 may be used to display information regarding system device capacity and/or performance. For example, zone 1 410 may be used to display in sub zone 412, text identifying the system device, which in this case, is "processor." Likewise, zone 2 420 and zone 6 460 may be used to display in sub zones 422 and 460 respectively, text identifying the corresponding system device "RAM" and "hard drive". In zone 1 410, a corresponding logo may be displayed in sub zone 414. In addition, text reflecting two parameters of the system device may be displayed in fields 416a and 416b of sub zone 416. For example, field 416a may display a processor operating speed determined using a first set of criteria, while field 416b may display a process operating speed determined using a second set of criteria. The first set of criteria may be determined by a vendor (e.g. company that produces the production system BIOS), while the second set of criteria may be determined by a manufacturer (e.g. processor manufacturer).

In zone 2 420, a text file containing the capacity of the system device identified in sub zone 422 may be displayed in sub zone 424. Likewise, a list of the hard drives, and their corresponding capacity or type, may be identified in the fields 464a, 464b and 464c. Other functions, logos or images may be similarly displayed in zone 3 430, zone 4 440 and zone 5 450.

Figure 5A:
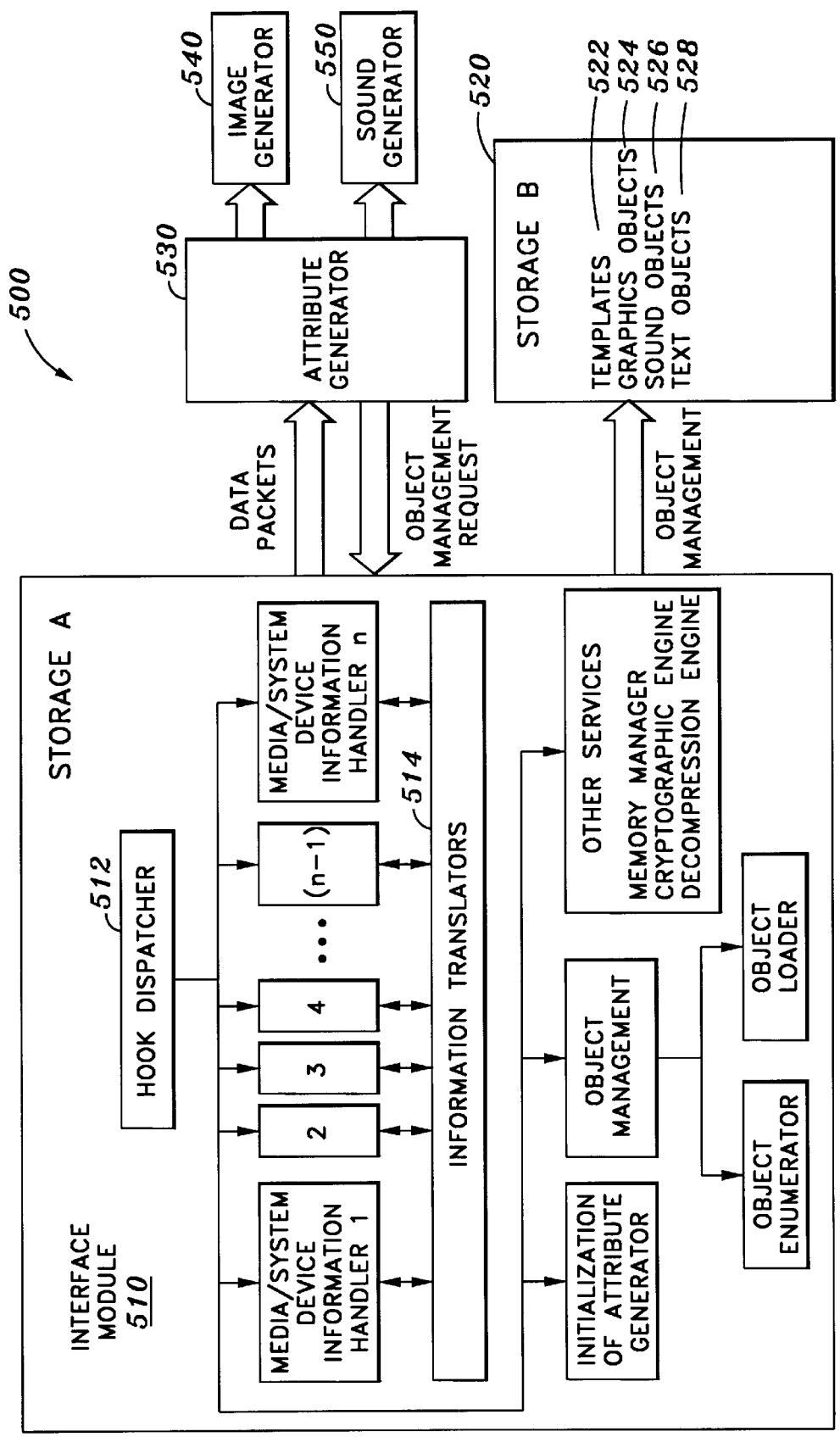
FIG. 5A is a diagram illustrating one embodiment of a system architecture of the software modules implemented in accordance with the principles of the invention.

FIG. 5A is a diagram illustrating one embodiment of a system architecture 500 of the software modules implemented in accordance with the principles of the invention. The architecture 500 includes a storage A in which an interface module 510 is located, and storage B 520 in which one or more templates 522, one or more graphics objects 524, one or more sound objects 526 and one or more text objects 528 are stored. In one embodiment, storage A and storage B may be implemented as system memory 124, system firmware 176, and/or memory module 190 as shown in FIG. 1. In another embodiment, storage A and storage B may be an integral unit. Alternatively, storage A and storage B may be separate storage units.

The storage 124/176/190 (FIG. 1) may be any storage medium such as random access memory (RAM), read only memory (ROM), erasable ROM (EROM), flash memory. In one preferred embodiment, the storage is a flash memory. The template 522, graphic object 524, sound object 526 and text objects 528 may be stored on the same physical storage medium or on separate storage medium(s) in any combination. The template 522, graphic object 524, sound object 526 and text object 528 can be updated.

The Interface Module 510 includes a hook dispatcher 512 that performs a variety of functions. In one embodiment, the hook dispatcher 512: (i) obtains media and/or system device information from the BIOS (alternatively, the hook dispatcher 512 may obtain media and/or system device information from the interface module 510 itself); (2) initializes the Attribute Generator 530; (iii) provides object management; and (iv) provides other services including but not limited to memory management, provides encryption/decryption, and decompression.

Examples of the information obtained from the processor may include the processor operating speed as measured using a first set of criteria and the processor operating speed as measured using a second set of criteria. The first set of criteria may include the operating speed of the processor as measured by the system BIOS on the fly. The first set of criteria may be that measured by code provided, specified or determined by a predetermined party, such as the company that produces the production system BIOS. For example, the first set of criteria may be implemented as code installed on the system BIOS. One example of such code includes the AwardBIOS 4.51, the AwardBIOS 6.0 and/or the Phoenix-BIOS 4.0 Release 6, each of which is marketed by Phoenix Technologies, Inc., San Jose, Calif. The second set of criteria may include tests/code provided, specified and/or determined by a second predetermined party, e.g. a processor manufacturer.

The measurement of the processor operating speed may be performed by one or more benchmark programs having a set of predetermined sequence of instructions. Real-time timing values can be obtained before and after the benchmark program is executed. The time interval during which the benchmark program is executed can be compared with results from known processor speeds. From this comparison, a relative speed and/or an absolute processor speed, expressed in terms of the processor clock frequency, can be determined.

Information obtained regarding the memory may include the type and capacity of memory available or installed. In addition, information regarding the IDE may include hard disk drives, CD-ROM drives, LS 120 drives, ZIP drives, DVD drives, etc.

When a task or performance of a system BIOS function (e.g., displaying of a processor graphics image) is required or requested, a request is issued from system BIOS. The request includes media and/or system device information, and is typically provided in the form of a raw number, from system BIOS. The raw number is converted by one of a plurality of Information Translators 514 to a readable format for another software module, such as the Attribute Generator 530. In particular, the Information Translators 514 receives the raw number and translates it to a string which includes the corresponding translated information. For example, if the operating speed of a processor is requested, the identification of the processor, such as type (e.g., AMD Athlon, Intel Pentium, Intel Celeron, etc.) of processor, is provided by referring to a processor map table (see FIG. 5B). This identification includes a keyword, which is translated by the Information Translator into an object name (FIG. 5B). The object name is then provided to the Attribute Generator 530. Upon receiving the object name, the Attribute Generator 530 performs a lexicographic analysis on one or more of the templates 522 by issuing an object management request. The object management request is dispatched to the one or more templates 522 via Interface Module 510. The Attribute Generator 530 also generates a corresponding graphic attribute, each of which includes a number of identifiers and/or graphic primitives to be operated on the graphic object to generate an image to be displayed on the display screen. The resulting image is then displayed in sub-zone 414, along with the text in fields 416a and 416b of sub-zone 416.

Figure 6:
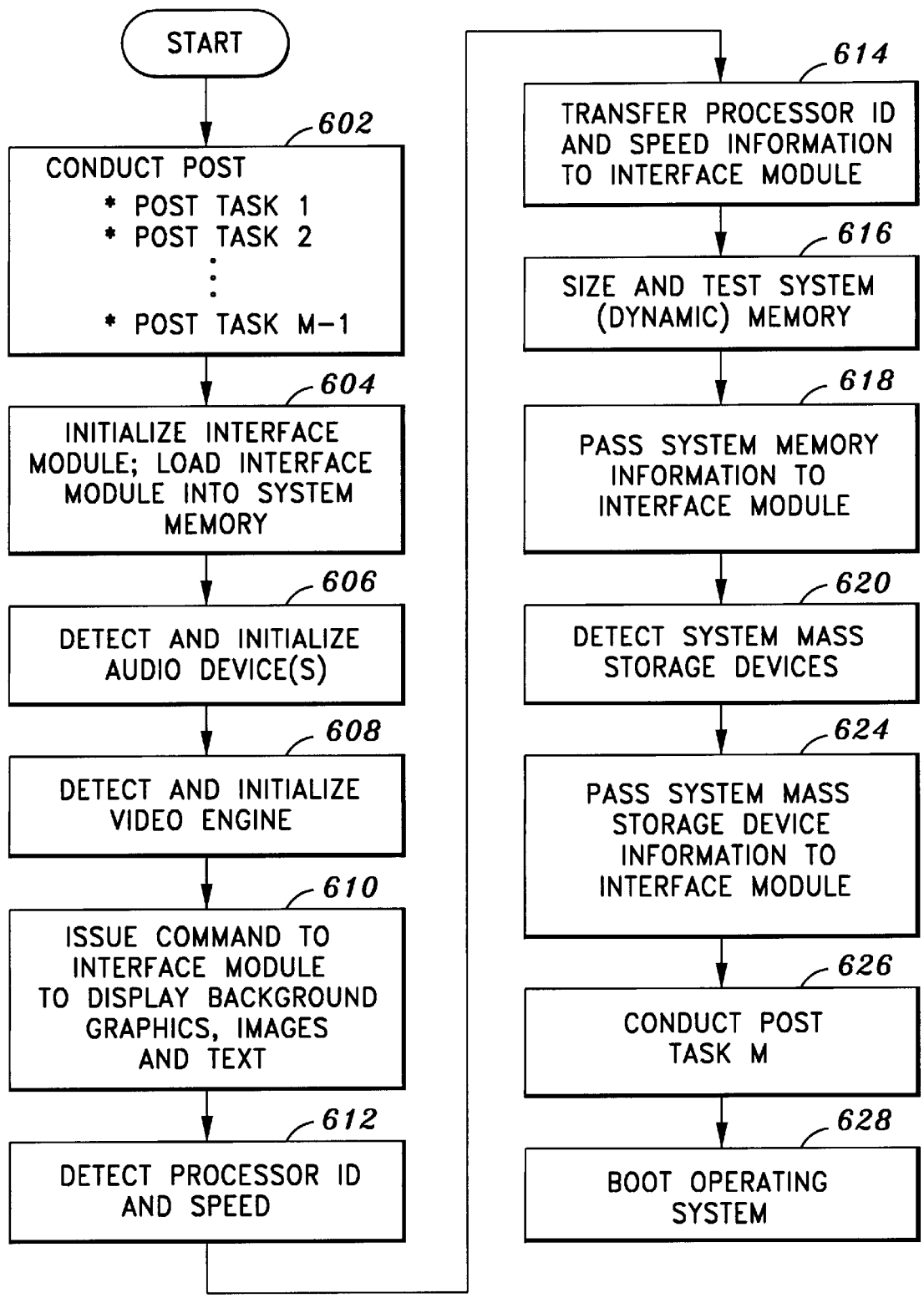
FIG. 6 is a flowchart illustrating one embodiment of a process to display information in accordance with the principles of the invention.

FIG. 6 is a flowchart illustrating one embodiment of a process 600 to display information in accordance with the principles of the invention. Beginning from a start state, the process 600 first conducts a Power On Self Test (POST), as shown in process block 602. The POST may include a plurality of tasks, such as task 1 through task (M–1). The process 600 next initializes the Interface Module 510 (see FIG. 5A) and loads the Interface Module 510 into system memory. Next, the process detects and initializes the audio device(s) located in the system, as shown in process block 606. The video engine(s) is then detected and initialized (process block 608).

Next, the process 1600 issues a command to the Interface Module 510 (FIG. 5A) to display background graphics, images and/or text, as shown in process block 610. The process 600 then proceeds to detect the processor identification and operating speed. In one embodiment, two types of operating speeds are provided. The first is an operating speed that is determined on-the-fly. Such an operating speed is determined by software using a predetermined set of criteria and may be provided, specified or determined by a party such as the company that produces the production system BIOS. Examples of such software includes the AwardBIOS 4.51, the AwardBIOS 6.0 and/or the Phoenix-BIOS 4.0 Release 6, each of which is marketed by Phoenix Technologies, Inc., San Jose, Calif. The second may be an operating speed determined by the processor manufacturer. In one embodiment, such manufacturer determined operating speed may be a fixed number provided by the manufacturer (obtained by reading a specific processor register), or a number determined by software supplied by the manufacturer. The latter number may be obtained by executing one or more software algorithms provided by the manufacturer. The source code for algorithms may reside in the system BIOS. Alternatively, the source code may be otherwise stored (e.g., provided as firmware or in another storage medium).

Once the processor identification and speed are determined, they are transferred to the Interface Module, as shown in process block 614. The process 600 then proceeds to process block 616 where it determines the size and tests the system memory. The process 600 then passes the system memory information to the interface module 600, as shown in process block 618.

Next, the process detects the system mass storage devices, as shown in process block 620. This information is passed to the Interface Module (process block 624). The process 600 then conducts other POST tasks, such as task M (process block 626). Upon completion of POST, the process 600 boots the operating system (process block 628).

It should be noted that the tasks described in process blocks 604, 606, 608, 610, 612, 614, 616, 618, 626 and 624 need not be performed in sequence or succession. For example, one of the tasks may be performed after POST task 7, and another may be performed after POST task 20. In one embodiment, the tasks described in process blocks 604, 606, 608, 610, 612, 614, 616, 618, 626 and 624 may be performed in any predetermined order, in succession or otherwise. In an alternate embodiment, the tasks may be performed in a manner determined by the software developer.

Figure 7:
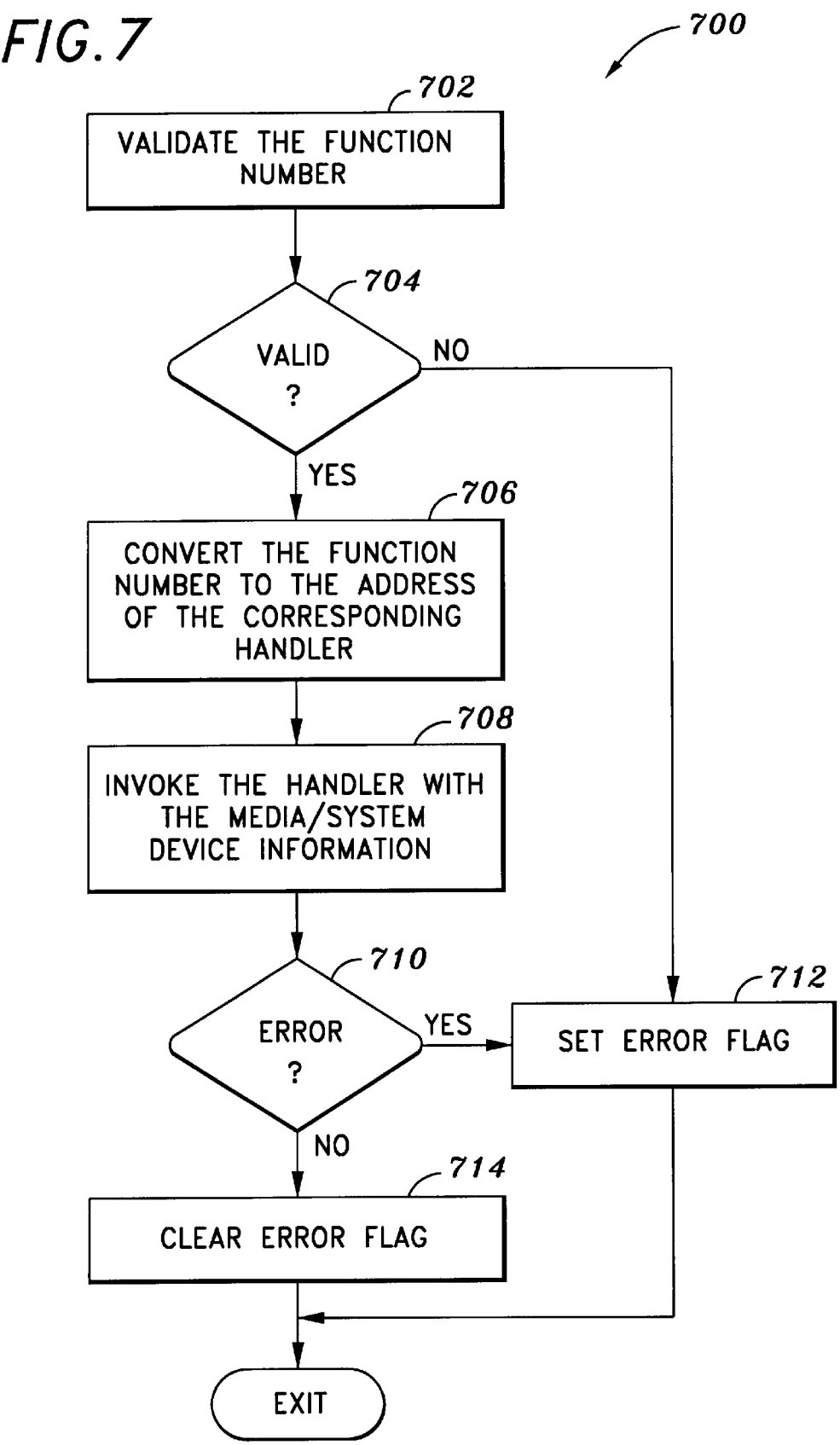
FIG. 7 is a flowchart illustrating one embodiment of a function dispatcher process provided in accordance with the principles of the invention.

FIG. 7 is a flowchart illustrating one embodiment of a function dispatcher process 700 provided in accordance with the principles of the invention. The process 700 is performed by the hook dispatcher 512 of the Interface Module 510 (FIG. 5A) upon request to perform a corresponding function. The function dispatcher process 700 may be implemented as (but not limited to) any one of the processes 610, 614, 618 and/or 624 (FIG. 6). Upon receipt of a request to perform a function, the process 700 first validates the function number, as shown in process block 702. If the function number is invalid (as determined in decision block 704), the process 700 proceeds to process block 712, where an error flag is set. The process 700 then exits. If the function number is determined to be valid, as shown in decision block 704, the process 700 converts the function number to the address of the corresponding handler (process block 706). Next, the handler with the media/system device information is invoked (process block 708). The process then determines if there is an error (decision block 710). If not, the error flag is cleared (process block 714) and the process 700 exits.

Figure 8:
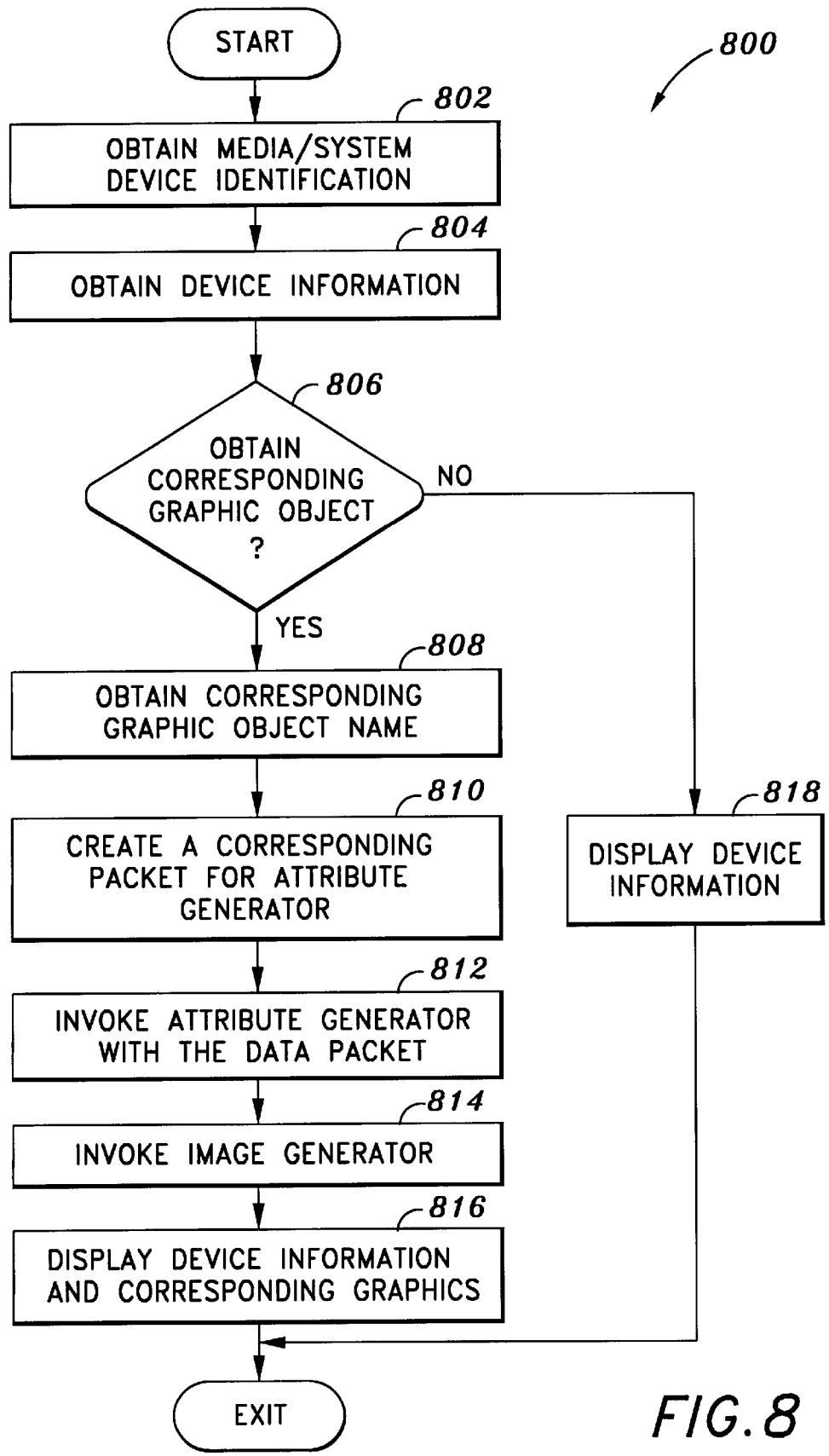
FIG. 8 is a flowchart illustrating one embodiment of an information handler process provided in accordance with the principles of the invention.

FIG. 8 is a flowchart illustrating one embodiment of an information handler process 800 provided in accordance with the principles of the invention. Beginning from a start state, the process 800 proceeds to obtain the media/system device identification (process block 802). The process 800 then obtains the associated device information, such as operating speed in the case of a processor, or memory size in the case of a memory device. Next, the process 800 determines if it should obtain a corresponding graphics object. If not, it proceeds to process block 818, where it displays the device information, and exits. Otherwise, it obtains the corresponding graphics object name (process block 808). The process 800 then advances to process block 810, where it creates a corresponding data packet for the Attribute Generator. The data packet is then used to invoke the Attribute Generator (process block 812). Once invoked, the Attribute Generator issues a command to the Image Generator to display the corresponding image (process block 814). The device information obtained earlier is displayed, and the Image Generator displays the corresponding graphics (process block 816). The process 800 then exits.

Figure 9:
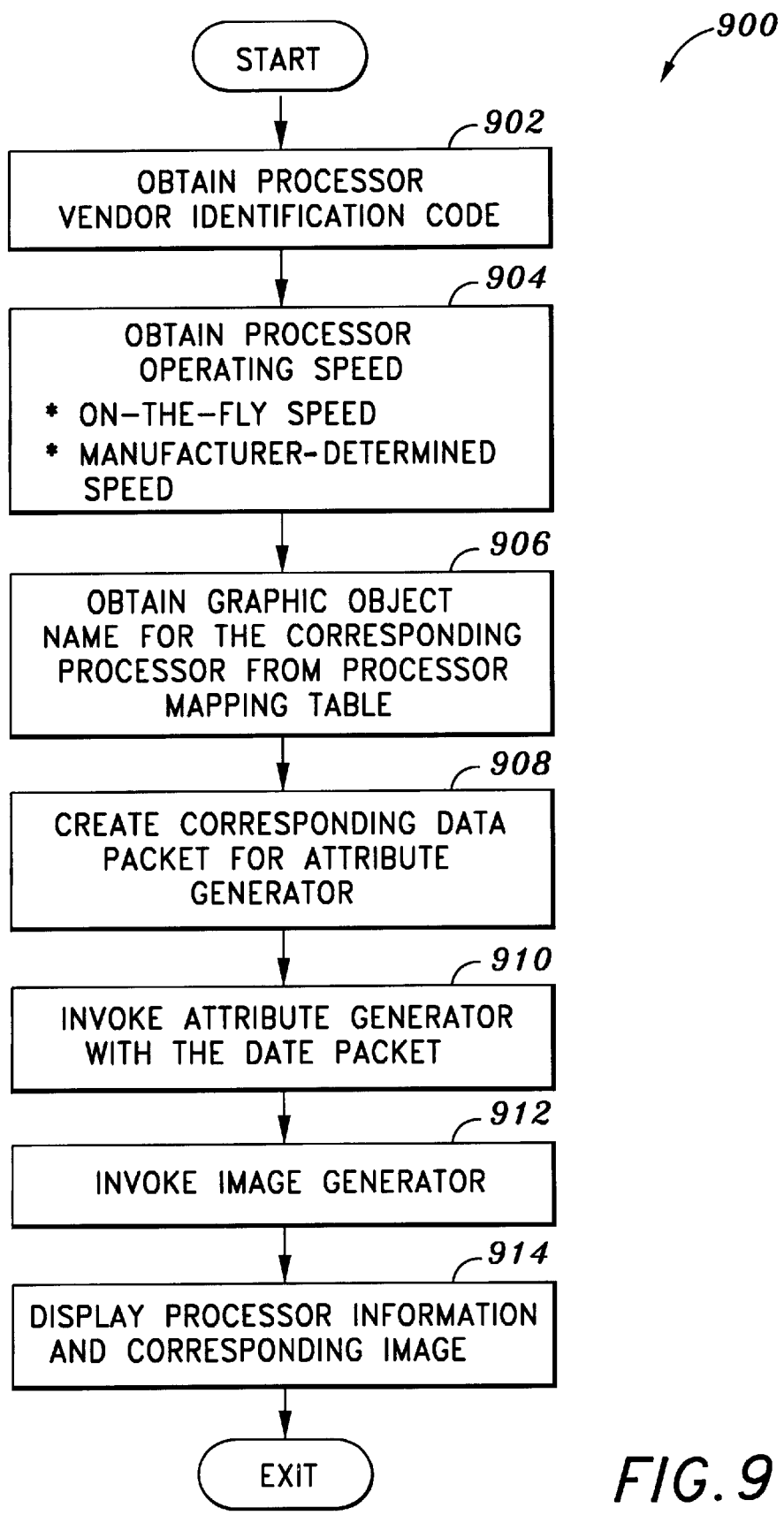
FIG. 9 is a flowchart illustrating one embodiment of a processor information and image handler process provided in accordance with the principles of the invention.

FIG. 9 is a flowchart illustrating one embodiment of a processor information and image handler process 900 provided in accordance with the principles of the invention. Beginning from a start state, the process 900 obtains the processor vendor identification code from firmware (process block 902). Next, the processor operating speed is obtained (process block 904). In one embodiment, this includes the manufacturer-determined operating speed, and the operating speed measured on-the-fly. Next, the graphic object name for the corresponding processor is obtained from a processor mapping table (process block 906). The process 900 then creates a corresponding data packet for the Attribute Generator (process block 908). The Attribute Generator is invoked with the data packet (process block 910), which in turn invokes the Image Generator (process block 912). The processor information (both manufacturer determined and that measured on-the-fly) is displayed, along with the corresponding image. The process 900 then exits.

Thus, the present invention is a method and apparatus to provide functionalities to system BIOS in a simple, elegant and flexible manner. An interface module is provided, which enables various parties such as PC system manufacturers and motherboard manufacturers to provide additional system BIOS functionalities with minimal impact to the system BIOS code. The method comprises interfacing an interface module to the system BIOS, and receiving a request from the system BIOS to perform a task. System device information associated with the task is received from the system BIOS. The interface module translates the system device information to provide translated information. The translated information is then transferred to a corresponding module.

The present invention also provides an efficient technique to generate a media output. The media output includes system device information that is generated on-the-fly, and also displays such information simply and efficiently. The technique generates a graphic attribute characterizing the graphic object from a template. The image is then generated from the graphic object using the graphic attribute. In another embodiment, a media device such as a graphics controller or an audio card is initialized during the early BIOS boot-up. Then a media operation is performed while the normal BIOS tasks are being performed.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to provide functionalities to a system BIOS, comprising:

interfacing an interface module to the system BIOS;

receiving a request from the system BIOS to perform a task;

receiving the system device information associated with the task from system BIOS;

translating, by the interface module, the system device information to provide translated information; and transferring the translated information to a corresponding module.

2. The method of claim 1, further comprising:

performing by the corresponding module, the task associated with the transferred translated information.

3. The method of claim 2, wherein performing the task assocaited with the transferred translated information comprises:

retrieving a template corresponding to a graphic object from a storage;

generating a graphic attribute from the template, the graphic attribute characterizing the graphic object; and generating an image from the graphic object according to the graphic attribute.

4. The method of claim 3, wherein the graphic attribute includes a location of the graphic object, a position of display, a size, a zone, a graphic primitive set, an animation primitive set, and a sound set.

5. The method of claim 4, wherein the graphic object is one of a banner, a logo, an advertisement item, and a textual item.

6. The method of claim 3, further comprising:

initializing a graphic controller to set a display environment; and writing the image to a display buffer associated with a graphic controller.

7. The method of claim 3, wherein generating the image comprises:
   retrieving the graphic object from the storage based on the graphic attribute; and
   transforming the graphic object to the image based on the graphic attribute.

8. The method of claim 4, wherein the zone includes a graphic zone, a textual zone, and an animation zone.

9. The method of claim 3, wherein the storage is a non-volatile writable memory.

10. A computer program product comprising:
   a computer usable medium having computer program code embodied therein to provide functionalities to a system BIOS, the computer program product having:
   computer readable program code to interface an interface module to the system BIOS;
   computer readable program code to receive a request from system BIOS to perform a task;
   computer readable program code to receive the system device information associated with the task from system BIOS;
   computer readable program code to translate the system device information to provide translated information; and
   computer readable program code to transfer the translated information to a corresponding module.

11. The computer program product of claim 10, further comprising:
   computer readable program code to cause the corresponding module to perform a task associated with the transferred translated information.

12. The computer program product of claim 11, wherein the computer readable program code to cause the corresponding module to perform a task associated with the transferred translated information comprises:
   computer readable program code to retrieve a template corresponding to a graphic object from a storage;
   computer readable program code to generate a graphic attribute from the template, the graphic attribute characterizing the graphic object; and
   computer readable program code to generate an image from the graphic object according to the graphic attribute.

13. The computer program product of claim 12, wherein the graphic attribute includes a location of the graphic object, a position of display, a size, a zone, a graphic primitive set, an animation primitive set, and a sound set.

14. The computer program product of claim 13, wherein the graphic object is one of a banner, a logo, an advertisement item, and a textual item.

15. The computer program product of claim 12, further comprising:
   computer readable program code to initialize a graphic controller to set a display environment; and
   computer readable program code to write the image to a display buffer associated with a graphic controller.

16. The computer program product of claim 12, wherein the computer readable program code to generate the image comprises:
   computer readable program code to retrieve the graphic object from the storage based on the graphic attribute; and
   computer readable program code to transform the graphic object to the image based on the graphic attribute.

17. The computer program product of claim 13, wherein the zone includes a graphic zone, a textual zone, and an animation zone.

18. The computer program product of claim 12, wherein the storage is a non-volatile writable memory.

19. A system comprising:
   a processor; and
   a memory coupled to the processor, the memory containing program code to provide functionalities to system BIOS, the program code, when executed by the processor, causes the processor to:
   interface an interface module to the system BIOS;
   receive a request from the system BIOS to perform a task;
   receive system device information associated with the task from system BIOS;
   cause the interface module to translate the system device information to provide translated information; and
   transfer the translated information to a corresponding module.

20. The system of claim 19, wherein the program code further causes the processor to:
   cause the corresponding module to perform the task associated with the transferred translated information.

21. The system of claim 20, wherein the program code causes the processor to cause the corresponding module to perform the task associated with the transferred translated information by:
   retrieving a template corresponding to a graphic object from a storage;
   generating a graphic attribute from the template, the graphic attribute characterizing the graphic object; and
   generating an image from the graphic object according to the graphic attribute.

22. The system of claim 21, wherein the graphic attribute includes a location of the graphic object, a position of display, a size, a zone, a graphic primitive set, an animation primitive set, and a sound set.

23. The system of claim 22, wherein the graphic object is one of a banner, a logo, an advertisement item, and a textual item.

24. The system of claim 21, wherein the program code when executed by the processor further causes the processor to:
   initialize a graphic controller to set a display environment; and
   write the image to a display buffer associated with a graphic controller.

25. The system of claim 21, wherein the program code causes the processor to generating the image by:
   retrieving the graphic object from the storage based on the graphic attribute; and
   transforming the graphic object to the image based on the graphic attribute.

26. The system of claim 22, wherein the zone indicates a graphic zone, a textual zone, and an animation zone.

27. The system of claim 22, wherein the storage is a non-volatile writable memory.

* * * * *